(12) United States Patent
Ainsworth et al.

(10) Patent No.: US 10,909,006 B2
(45) Date of Patent: Feb. 2, 2021

(54) MAIN PROCESSOR ERROR DETECTION USING CHECKER PROCESSORS

(71) Applicants: Arm Limited, Cambridge (GB); THE CHANCELLOR, MASTERS AND SCHOLARS OF THE UNIVERSITY OF CAMBRIDGE, Cambridge (GB)

(72) Inventors: Sam Ainsworth, Cambridge (GB); Thomas Christopher Grocutt, Cambridge (GB); Timothy Martin Jones, Cambridge (GB)

(73) Assignees: Arm Limited, Cambridge (GB); The Chancellor, Masters and Scholars of the University of Cambridge, Cambridge (GB)

(*) Notice: Subject to any disclaimer, the term of this patent is extended or adjusted under 35 U.S.C. 154(b) by 109 days.

(21) Appl. No.: 16/338,757

(22) PCT Filed: Oct. 20, 2017

(86) PCT No.: PCT/GB2017/053179
§ 371 (c)(1),
(2) Date: Apr. 2, 2019

(87) PCT Pub. No.: WO2018/083441
PCT Pub. Date: May 11, 2018

(65) Prior Publication Data
US 2020/0089559 A1    Mar. 19, 2020

(30) Foreign Application Priority Data

Nov. 4, 2016  (GB) .................................. 1618655.3

(51) Int. Cl.
G06F 11/16       (2006.01)
G06F 11/14       (2006.01)

(52) U.S. Cl.
CPC ...... G06F 11/1629 (2013.01); G06F 11/1407 (2013.01)

(58) Field of Classification Search
CPC ............. G06F 11/1407; G06F 11/1471; G06F 11/1608; G06F 11/1629; G06F 11/1633;
(Continued)

(56) References Cited

U.S. PATENT DOCUMENTS 3,624,372 A * 11/1971 Philip ................. G06F 11/1654
714/25
4,849,979 A *  7/1989 Maccianti ........... G06F 11/1633
714/41

(Continued)

OTHER PUBLICATIONS

International Search Report and Written Opinion of the ISA for PCT/GB2017/053179 filed Jan. 15, 2018, 14 pages.

(Continued)

Primary Examiner — Gabriel Chu
(74) Attorney, Agent, or Firm — Nixon & Vanderhye P.C.

(57) ABSTRACT

An apparatus comprises a main processor to execute a main stream of program instructions, two or more checker processors to execute respective checker streams of program instructions in parallel with each other, the checker streams corresponding to different portions of the main stream executed by the main processor, and error detection circuitry to detect an error when a mismatch is detected between an outcome of a given portion of the main stream executed on the main processor and an outcome of the corresponding checker stream executed on one of the plurality of checker processors. This approach enables high performance main processors 4 to be checked for errors with lower circuit area and power consumption overhead than a dual-core lockstep technique.

24 Claims, 5 Drawing Sheets

(58) Field of Classification Search
CPC ............. G06F 11/1637; G06F 11/1641; G06F 11/1645; G06F 11/165; G06F 11/1654; G06F 11/18; G06F 11/181; G06F 11/183; G06F 11/184; G06F 9/3017; G06F 9/38; G06F 9/3836; G06F 9/3851; G06F 9/3861; G06F 9/3863; G06F 9/3877; G06F 9/3885
See application file for complete search history.

(56) References Cited

U.S. PATENT DOCUMENTS

| | | | | |
|---|---|---|---|---|
| 5,133,077 | A * | 7/1992 | Karne | G06F 9/30 712/23 |
| 5,138,708 | A | 8/1992 | Vosbury | |
| 2002/0133751 | A1* | 9/2002 | Nair | G06F 11/1645 714/38.1 |
| 2002/0152418 | A1* | 10/2002 | Griffin | G06F 11/1645 714/11 |
| 2004/0025078 | A1* | 2/2004 | Nagano | G05B 19/058 714/11 |
| 2005/0050307 | A1 | 3/2005 | Reinhardt et al. | |
| 2005/0246587 | A1* | 11/2005 | Bernick | G06F 9/52 714/38.13 |
| 2011/0302450 | A1* | 12/2011 | Hickey | G06F 9/30185 714/17 |
| 2012/0030519 | A1 | 2/2012 | Wilt et al. | |
| 2012/0304024 | A1* | 11/2012 | Rohleder | G06F 9/38 714/49 |
| 2014/0258684 | A1* | 9/2014 | Hastie | G06F 11/0793 712/216 |
| 2016/0055047 | A1 | 2/2016 | Okamoto | |
| 2019/0188093 | A1* | 6/2019 | Eckelmann-Wendt | G06F 30/34 |

OTHER PUBLICATIONS

Combined Search and Examination Report for GB1618655.3 dated May 10, 2017, 6 pages.
Yano et al., "V60/V70 Microprocessor and its Systems Support Functions", Digest of Papers—COMPCON Spring 88 Thirty-Third IEEE Computer Society International Conference, IEEE, Feb. 1988, pp. 36-42.
Reinhardt et al., "Transient Fault Detection via Simultaneous Multithreading", *ISCA 00,* ACM, Jun. 2000, pp. 25-36.
Hernandez et al., "Timely Error Detection for Effective Recovery in Light-Lockstep Automotive Systems", IEEE Transactions on Computer-Aided Design of Integrated Circuits and Systems, vol. 34, No. 11, Nov. 2015, pp. 1718-1729.
Rausand, "Reliability of Safety-Critical Systems—Theory and Applications", John Wiley & Sons, Mar. 2014, 47 pages.
Werdmuller—a Blog, "Addressing functional safety applications with ARM Cortex-R5", Jan. 2015, 6 pages.
Slegel et al., "IBM's S/390 G5 Microprocessor Design", IEEE Micro, vol. 19, No. 2, Mar.-Apr. 1999, pp. 12-23.
Rotenberg, "AR-SMT: A Microarchitectural Approach to Fault Tolerance in Microprocessors", IEEE, Jun. 15-18, 1999, 8 pages.
Mukherjee et al., "Detailed Design and Evaluation of Redundant Multithreading Alternatives", ISCA'02, May 25-29, 2002, 12 pages.
Schuchman et al., "Blackjack: Hard Error Detection with Redundant Threads on SMT", IEEE, Jun. 25-28, 2007, 10 pages.
Pargeter, "An example of strong induction", The Mathematical Gazette, vol. 80, No. 488, Jul. 1996, 1 page.
Srinivasan et al., "The Impact of Technology Scaling on Lifetime Reliability", DSN '04, Jun. 2004, 10 pages.
Michalak et al., "Predicting the Number of Fatal Soft Errors in Los Alamos National Laboratory's ASC Q Supercomputer", IEEE Transactions on Device and Materials Reliability, vol. 5, No. 3, Sep. 2005, pp. 329-335.
Borkar et al., "The Future of Microprocessors", Communications of the ACM, vol. 54, No. 5, May 2011, pp. 67-77.
Schroeder et al., "DRAM Errors in the Wild: A Large-Scale Field Study", SIGMETRICS/Performance '09, Jun. 15-19, 2009, 12 pages.
Reis et al., "Design and Evaluation of Hybrid Fault-Detection Systems", ISCA'05, IEEE Computer Society, Jun. 4-8, 2005, 12 pages.
Reis et al., "SWIFT: Software Implemented Fault Tolerance", Proceedings of the international symposium on Code generation and optimization (CGO'05), IEEE Computer Society, Mar. 20-23, 2005, 12 pages.
Hameed et al., "Understanding Sources of Inefficiency in General-Purpose Chips", ISCA '10, Jun. 19-23, 2010, 11 pages.
Shafique et al., "Agent-Based Distributed Power Management for Kilo-Core Processors", Proceedings of the International Conference on Computer-Aided Design. IEEE Press, Nov. 18-21, 2013, pp. 153-160.
"Green500 List for Jun. 2016", 1 page, https://www.top500.org/green500/lists/2016/06/.
Fang et al., "Test-Driving Intel Xeon Phi", Proceedings of the 5th ACM/SPEC international conference on Performance engineering (ICPE'14), ACM, Mar. 22-26, 2014, 12 pages.
Sorin et al., "SafetyNet: Improving the Availability of Shared Memory Multiprocessors with Global Checkpoint/Recovery", ISCA-29, May 25-29, 2002, 12 pages.
Jhingran et al., "Analysis of Recovery in a Database System Using a Write-Ahead Log Protocol", vol. 21. No. 2, ACM SIGMOD, Jun. 1, 1992, pp. 175-184.
Herlihy et al., "Transactional Memory: Architectural Support for Lock-Free Data Structures", IEEE, May 16-19, 1993, pp. 289-300.
Luszczek et al., "The HPC Challenge (HPCC) Benchmark Suite", Proceedings of the 2006 ACM/IEEE conference on Supercomputing, Nov. 12, 2006, 105 pages.
Iturbe et al, "A Triple Core Lock-Step (TCLS) ARM Cortex-R5 Processor for Safety-Critical and Ultra-Reliable Applications", 2016 46th Annual IEEE/IFIP International Conference on Dependable Systems and Networks Workshop (DSN-W), IEEE, Jun. 28, 2016, pp. 246-249.
Guthaus et al., "MiBench: A free, commercially representative embedded benchmark suite", Proceedings of the fourth annual IEEE international workshop on workload characterization WWC-4 (Cat. No. 01EX538), IEEE, Dec. 2, 2001, 12 pages.
Bienia, "Benchmarking Modern Multiprocessors", Princeton University; Jan. 2011, 153 pages.
Binkert et al., "The gem5 Simulator", vol. 39, No. 2, ACM SIGARCH Computer Architecture News, May 2011, 7 pages.
Gutierrez et al., "Sources of Error in Full-System Simulation", 2014 IEEE International Symposium on Performance Analysis of Systems and Software (ISPASS), IEEE, Mar. 23, 2014, 10 pages.
"ARM Cortex-M Instruction Sets", 1 page, http://www.anandtech.com/show/8542/cortexm7-launches-embedded-iot-and-wearables/2.
"Exynos 5433-A57 Synthetic Power Curves", 1 page, http://www.anandtech.com/show/8718/the-samsung-galaxy-note-4-exynos-review/6.
Yabuuchi et al., "13.3 20nm High-Density Single-Port and Dual-Port SRAMs with Wordline-Voltage-Adjustment System for Read/Write Assists", 2014 IEEE International Solid-State Circuits Conference Digest of Technical Papers (ISSCC), IEEE, Feb. 9, 2014, pp. 234-235.
Li et al., "McPAT: An Integrated Power, Area, and Timing Modeling Framework for Multicore and Manycore Architectures", Proceedings of the 42nd Annual IEEE/ACM International Symposium on Microarchitecture (MICRO'09), ACM, Dec. 12-16, 2009, 12 pages.
Data Integrity for Compaq NonStop Himalaya Servers, Compaq NonStop Himalaya Servers White Paper, www.compaq.com, Apr. 1999, 20 pages.
Gupta et al., "The StageNet Fabric for Constructing Resilient Multicore Systems", 2008 41st IEEE/ACM International Symposium on Microarchitecture. IEEE, Nov. 8, 2008, 11 pages.

(56) References Cited

OTHER PUBLICATIONS

Smolens et al., "Reunion: Complexity—Effective Multicore Redundancy", Proceedings of the 39th Annual IEEE/ACM International Symposium on Microarchitecture (MICRO 39), IEEE Computer Society, Dec. 9, 2006, 12 pages.
Khudia et al., "Harnessing Soft Computations for Low-Budget Fault Tolerance", Proceedings of the 47th Annual IEEE/ACM International Symposium on Microarchitecture (MICRO-47), IEEE Computer Society, Dec. 13, 2014, 12 pages.
Wang et al., "ReStore: Symptom Based Soft Error Detection in Microprocessors." IEEE Transactions on Dependable and Secure Computing, vol. 3, Issue 3, Jul. 2006, 10 pages.
Jeffery et al., "A Flexible Approach to Improving System Reliability with Virtual Lockstep". IEEE Transactions on Dependable and Secure Computing, vol. 9, Issue 1, Sep. 2010, 14 pages.
Ansari et al., "Necromancer: Enhancing System Throughput by Animating Dead Cores", Proceedings of the 37th annual international symposium on Computer architecture (ISCA '10), ACM SIGARCH Computer Architecture News, vol. 38, No. 3, Jun. 19-23, 2010, 12 pages.
LaFrieda et al., "Utilizing Dynamically Coupled Cores to Form a Resilient Chip Multiprocessor", 37th Annual IEEE/IFIP International Conference on Dependable Systems and Networks (DSN'07), IEEE, Jun. 25, 2007, 10 pages.
Austin, "DIVA: A Reliable Substrate for Deep Submicron Microarchitecture Design", Proceedings of the 32nd Annual ACM/IEEE International Symposium on Microarchitecture (MICRO-32), IEEE, Nov. 1999, 12 pages.
Liu et al., "Clover: Compiler Directed Lightweight Soft Error Resilience", ACM SIGPLAN Notices—LCTES'15, ACM, Jun. 18-19, 2015, 10 pages.
Aggarwal et al., "Configurable Isolation: Building High Availability Systems with Commodity Multi-Core Processors", ACM SIGARCH Computer Architecture News—ISCA'07, Jun. 9-13, 2007, 12 pages.
Romanescu et al., "Core Cannibalization Architecture: Improving Lifetime Chip Performance for Multicore Processors in the Presence of Hard Faults", 2008 International Conference on Parallel Architectures and Compilation Techniques (PACT'08), ACM, Oct. 25-29, 2008, 10 pages.
Gupta et al., "StageWeb: Interweaving Pipeline Stages into a Wearout and Variation Tolerant CMP Fabric", 2010 IEEE/IFIP International Conference on Dependable Systems & Networks (DSN), IEEE, Jun. 2010, 10 pages.
Powell et al., "Architectural Core Salvaging in a Multi-Core Processor for Hard-Error Tolerance", Proceedings of the 36th annual international symposium on Computer architecture (ISCA'09), ACM, Jun. 20-24, 2009, 12 pages.
Blake et al., "Evolution of Thread-Level Parallelism in Desktop Applications", ISCA'10, Jun. 19-23, 2010, 12 pages.

\* cited by examiner

ID="1"/>
MAIN PROCESSOR ERROR DETECTION USING CHECKER PROCESSORS

This application is the U.S. national phase of International Application No. PCT/GB2017/053179 filed Oct. 20, 2017 which designated the U.S. and claims priority to GB Patent Application No. 1618655.3 filed Nov. 4, 2016, the entire contents of each of which are hereby incorporated by reference.

The present technique relates to the field of data processing. More particularly, it relates to error detection.

Hardware faults, including soft (transient) faults and hard (permanent) faults, are increasingly common in data processing systems. As the number of transistors in a system increases and feature sizes decrease, the likelihood of a failure increases, as smaller transistors are more vulnerable to transient errors caused by cosmic rays or other particle strikes, and increased variability at smaller feature sizes significantly increases the occurrence of transient faults. At the same time, workloads performed on data processing systems are increasingly error intolerant, especially for applications such as the automotive industry where strict safety standards are required. Hence, techniques for detecting errors in data processing systems are becoming increasingly important.

At least some examples provide an apparatus comprising:
a main processor to execute a main stream of program instructions;
a plurality of checker processors to execute respective checker streams of program instructions in parallel with each other, the checker streams corresponding to different portions of the main stream executed by the main processor; and
error detection circuitry to detect an error when a mismatch is detected between an outcome of a given portion of the main stream executed on the main processor and an outcome of the corresponding checker stream executed on one of the plurality of checker processors.

At least some examples provide a data processing method comprising:
executing a main stream of program instructions on a main processor;
executing respective checker streams of program instructions in parallel on a plurality of checker processors, the checker streams corresponding to different portions of the main stream executed by the main processor; and
detecting an error when a mismatch is detected between an outcome of a given portion of the main stream executed on the main processor and an outcome of the corresponding checker stream executed on one of the plurality of checker processors.

Further aspects, features and advantages of the present technique will be apparent from the following description of examples, which is to be read in conjunction with the accompanying drawings, in which:

FIG. 1 schematically illustrates a data processing system comprising a main processor for executing a main stream of program instructions and multiple checker processors for executing checker streams of program instructions corresponding to respective portions of the main stream;

FIG. 2 schematically illustrates an example of the checker processors processing respective checker streams in parallel;

Figure 1:
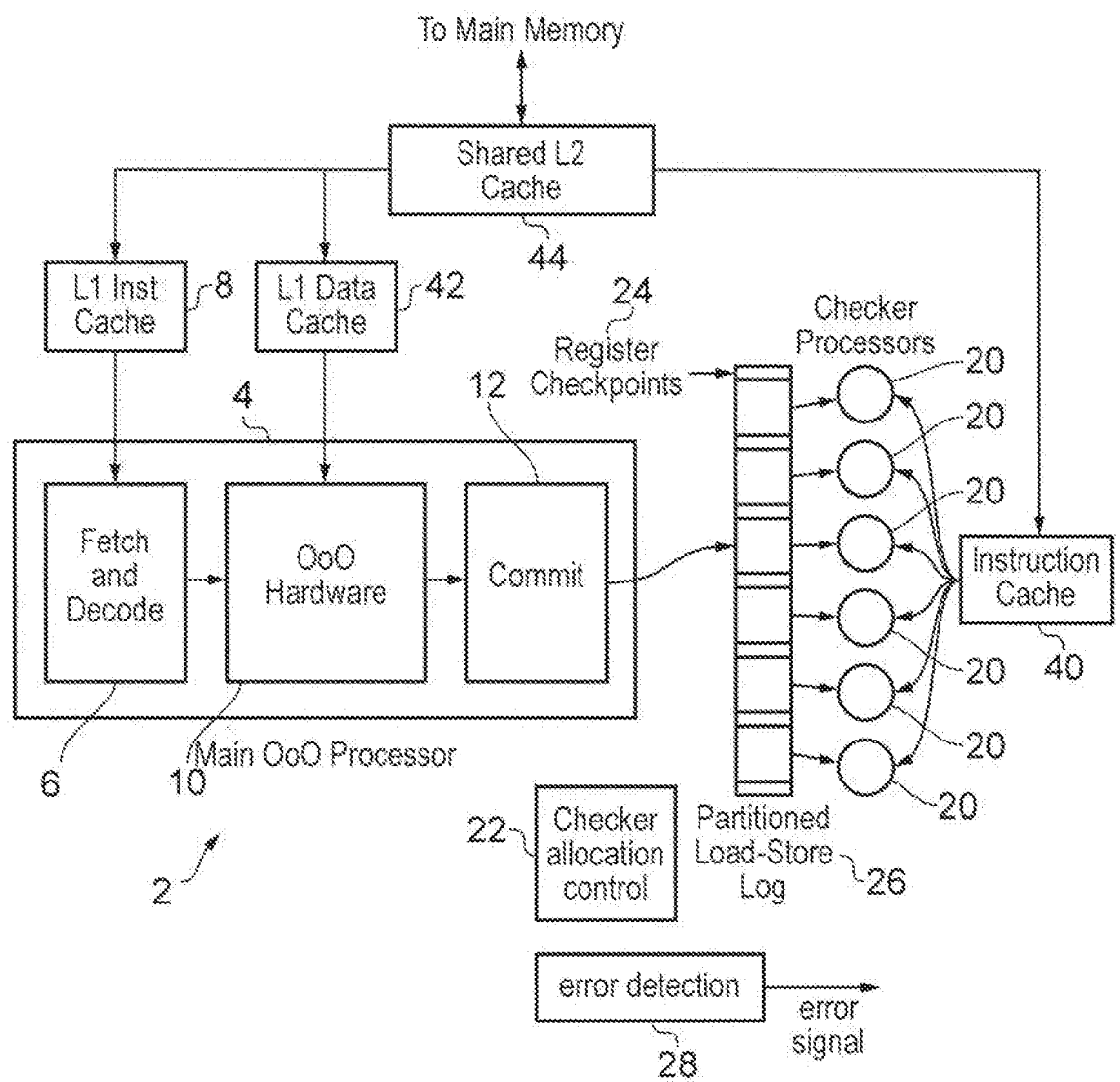

Error detection can be challenging to implement, especially for larger more complex processors. One approach can be to use a dual-core lockstep technique, where two versions of the same processor are provided and execute the same instructions on the same inputs in parallel so that errors can be detected when there is divergence between the outcomes of the two processors. However, this approach requires the second core to keep pace with the first core, so an entire second core has to be provided which is identical to the first core, doubling the area and power consumption of the processing system. This can be a significant cost especially when the main processor is a relatively complex high performance processor (such as a processor supporting out-of-order execution). Also, as many interfaces on the respective cores are compared to detect errors, a significant amount of additional wiring would be required. For more complex processors, due to the physical size of these processors and hence the relatively large distance between the two redundant processors, this wiring can become a significant problem to implement, limiting the frequency at which the processors can operate, and hence ultimately limiting the size of the processors to which such a dual-core lockstep technique can be applied.

Another alternative is to provide a single processor and use redundancy at the software level to detect errors. For example, a duplicate thread could be run in a simultaneous multi-threading system, or in a system supporting virtualisation a hypervisor may be used to duplicate a workload and perform periodic comparisons to check for faults. However, while these approaches reduce the area and implementation problems, they still have significant disadvantages. Firstly, the available performance of the system is significantly reduced. Also, since the computation is still being performed twice, on a relatively large processor there is still a significant power consumption penalty. Also, as the duplicate workload is run on the same hardware as the main workload, it is possible that some hard faults would not be detected as the same error would occur for both the main and duplicate workloads.

Increasingly, emerging applications such as automated driving are requiring the combination of robust error detection and high performance, and so it is desirable to provide an error detection technique which overcomes the issues described above.

An apparatus may be provided comprising a main processor to execute a main stream of program instructions, and two or more checker processors to execute respective checker streams of program instructions in parallel with each other, with the checker streams corresponding to different portions of the main stream executed by the main processor. Error detection circuitry is provided to detect an error when a mismatch is detected between an outcome of a given portion of the main stream executed on the main processor and an outcome of the corresponding checker stream executed on one of the plurality of checker processors.

Hence, multiple checker processors operate in parallel to process checker streams corresponding to different portions of the main stream. By distributing the checker streams corresponding to different portions of the main stream across a number of checker processors, it is not necessary for any individual checker processor to keep up with the main processor's level of performance, so that smaller less complex checker processors can be used, reducing the circuit area and power consumption overhead and the wiring complexity of the error checking compared to a dual-core lockstep technique. Hence, this approach can scale better to larger main processors. Also, as the main processor does not execute the checker streams itself, the checking has little impact on the performance achieved for the main stream executed by the main processor, and hard errors affecting the main processor can be detected since the checker streams are executed on a different processor.

The main processor may be capable of processing program instructions with a greater instruction throughput than each of the checker processors. In general, the main processor may differ from the checker processors in any way which permits higher maximum instruction throughput than the checker processors. For example, the main processor may be an out-of-order processor while the checker processors are in-order processors, and/or may support issue and execution of a greater number of instructions in parallel. Typically, processors providing higher performance require more unit area and more power consumption per computation, and so checking the processing of the main processor using an array of checker processors with lower instruction throughput can be significantly more area and energy efficient than providing a duplicate processor identical to the main processor.

The apparatus may have checkpoint circuitry to store a number of checkpoint entries, each checkpoint entry indicative of architectural state of the main processor captured in response to a respective checking boundary event during execution of the main stream. The architectural state may include data from general purpose registers, control data such as a program counter indicating a current point of execution of the main stream, and any other state information required for the checker stream to commence processing of the relevant checker stream from a point corresponding to the start of the corresponding portion of the main stream. Hence, on starting a given checker stream, the checker processor may start processing the checker stream using the architectural state indicated by one checkpoint entry of the checkpoint circuitry, and on completion of the checker stream the error detection circuitry can identify whether there is a mismatch between the architectural state generated by the checker processor in response to the checker stream with architectural state indicated by a following checkpoint entry of the checkpoint circuitry, and signal an error if there is a mismatch.

In some implementations, if an error is detected, the checkpoint entries of the checkpoint circuitry may also be used to recover from the error, as an error recovery operation can be performed to restore the architectural state captured at a point of the main stream before the error occurred to the architectural state registers of the main processor.

Memory accesses (e.g. load or store operations) performed by the main processor during the main stream may also be tracked, using memory log circuitry comprising a number of memory log entries, each memory log entry comprising tracking data indicative of data values and addresses of memory accesses triggered by the main processor during a corresponding portion of the main stream. In this context, "memory accesses" include accesses to both a cache and main memory (hence "memory" encompasses "cache"). The memory log circuitry could be implemented using on-chip storage or off-chip storage.

In some examples, the memory log circuitry may only capture tracking data relating to store operations (operations to store a data value from a register to a location in memory), with load operations (operations to read a value from memory and store it in a register) not being tracked by the memory log circuitry. By tracking the addresses and data values of store operations performed by the main processor, the error detection circuitry can detect whether an error has occurred for a given store operation in dependence on whether a data value to be stored for a given address by one of the checker processors matches the data value recorded in a corresponding memory log entry for said given address. Although some errors affecting store operations may in any case be detected from the comparison of the architectural state data with the stored checkpoint entry at the end of the checker stream, some types of errors, such as errors caused by corruption of a data value while resident in a load/store queue and errors in values stored to memory which are no longer resident in the register file by the time the end of the checker stream is reached, may not be detected using the checkpoint mechanism, and so the memory access log can help to increase robustness against errors.

In some examples, load operations may not need to be tracked by the memory log circuitry, since if there is an error in the value loaded into a register of the main processor then either it will change the outcome of the checker stream which can be detected from comparison of the checkpoint data with the checker processor's architectural state or a stored value between the checkpoints, or if the error in the load value ends up not affecting the result, then there is no need to signal an error at all. Therefore, in some embodiments the memory log circuitry may track the addresses and data values of store operations only. If load operations are not tracked, then on encountering a load instruction in a checker stream, the checker processor may obtain the data value to be loaded from memory (essentially repeating the load already performed by the main processor).

However, in other examples, both load operations and store operations may be tracked by the memory log circuitry. Even though tracking of load operations may not be needed for error detection purposes, tracking the addresses and data values of load operations anyway can help to improve the performance of the checker processors because then the data value to be loaded can be obtained directly from the corresponding memory log entry, avoiding the need to access the data from memory which could potentially lead to a long delay if the data previously accessed by the main processor is no longer in a cache. Hence, as well as tracking store operations for error detection purposes, the memory log circuitry can also track load operations to enable forwarding of load results from the main processor to the checker processors.

Other examples may use a hybrid approach where load operations are generally not tracked, unless at least one condition occurs triggering tracking of a specific load operation. Hence, in some cases the memory log circuitry may track all store operations and selected load operations.

One example may be where the selected load operations comprise load operations for which the address associated with the load is marked as non-cacheable. For example, a memory protection unit or memory management unit may define attributes for given address ranges, including a parameter specifying whether data from a given range of addresses can be cached at a given level of a cache hierarchy. For non-cacheable addresses, it will typically be slower to access the corresponding data from a further-level cache or main memory, and so to avoid excessive delays for the checker processor encountering such a load, it can be preferable to write the data value and address of that load to the relevant memory log entry when the load is performed by the main processor. Avoiding too long a delay at the checker processors can be important as if the checker processors take a very long time to process each checker stream then this may increase the likelihood that all the checker processors are busy processing checker streams corresponding to previous portions of the main stream (and that all the checkpoint entries or memory log entries become full so that it is not possible to track data for a new portion of the main stream), in which case the main processor may have to stall its processing to ensure errors can be detected. Therefore, improving performance at the checker processor can also help to improve performance at the main processor by reducing the chance of stalls.

In cases where it is known in advance that an address will not be accessed for a long period of time a load operation may be marked as non-temporal. To improve cache efficiency the main processor may choose not to store the data associated with non-temporal accesses in the cache. If the main processor does not cache the data, when the checker processor executes the corresponding checker stream, it would need to load the data from main memory, which would stall the checker processor for some time. Hence, to avoid stalling the checker processors the memory log circuitry may also track non-temporal load operations (load operations marked with a hint indicating that the corresponding data value need not be cached).

Another example of selected load operations which could be tracked by the memory log circuitry may be load operations for which the main processor has executed a subsequent store operation for the same address before a checker processor has executed the corresponding load operation in the checker stream. Since the checker processor may be executing its checker stream some time after the corresponding portion of the main processor was completed, it is possible that there could be an intervening store operation which overwrites the value previously read by the main processor, and so in this case the value seen by the checker processor on repeating the load could be different to the value originally loaded by the main processor, and so if loads are not tracked by the memory log circuitry then this may lead to some false positive errors being detected which do not represent a real error affecting the validity of the main processor's operation. If such false positive errors are sufficiently rare, it may be preferable not to incur the overhead in tracking load operations at all. However, in other implementations the overhead of an unnecessary recovery operation can be avoided by detecting or predicting when a previously loaded address is overwritten by a subsequent store and copying the original data value and the address of the previous load to the memory log circuitry in this case.

Note that in cases where only selected loads are tracked by the memory log circuitry, while in general selected loads meeting a certain criterion may be tracked, it is possible that some other loads not meeting that criterion may still be tracked by the memory log circuitry, because to reduce the cost of the detection mechanism for detecting whether loads meet the criterion, circuitry may be used which permits some false positive detections of whether the load meets the criterion. For example, to detect whether a load is followed by a subsequent store to the same address, one technique for reducing the hardware cost may be to use a structure such as a Bloom filter, which ensures there are no false negative matches between previously encountered load addresses and subsequent stores, but allows some false positive matches. Therefore, in the cases where selected loads are tracked, the memory log may include tracking data for at least the selected loads, but also possibly tracking data for some other loads as well.

In examples where both store operations and (at least some) load operations are tracked by the memory log circuitry, the memory log circuitry could be implemented using a common structure shared between stores and loads (e.g. a table structure where each entry includes a flag indicating whether the corresponding target address and data value relates to a store or a load). Alternatively, separate data structures could be provided for tracking load and store operations respectively.

Most errors occurring during the processing of the main stream by the main processor may be recovered from by simply restoring architectural state from a previous point of execution to the main processor's registers. However, if an error occurs with a store operation, if the erroneous value has already been stored out to memory by the time the error is detected, this could also cause errors for other processing threads being executed or other devices within the same processing system which could have read the incorrect value from the memory. One way to avoid errors in the main stream propagating out to other threads or devices may be to defer committing store transactions to memory until the error detection circuitry has detected whether an error occurred for that store instruction.

However, as the checker processors are typically operating for some time after the corresponding portion of the main stream has already been completed, holding back stores until they have been checked may be infeasible as it may require a large structure for queuing the stores and adding an indirection table for load-store forwarding for a relatively large number of stores may slow down the common case of error-free execution. Therefore, in some examples it may be preferable to allow the main processor to commit store transactions before the error detection circuitry has detected whether an error occurred for that store instruction. Although this could sometimes allow errors in the main stream to affect the operation of other devices or threads, this approach can be preferable to enable the common case of error-free operation to have higher performance at the expense of the rarely required recovery operation being more complex and slow (e.g. in this case to recover from the error software may need to report the error to other threads or devices which may then themselves need to rewind to an earlier point of execution).

Another approach can be for some store operations to be committed without waiting for the error detection circuitry to confirm them as error-free, while other store operations are held back and committed once cleared of errors, depending on the target address of the store operation. For example, for most regions of the memory address space, a reboot of the system may successfully resolve any error in the data in memory, so that it is acceptable to allow potentially erroneous store operations to update the memory before they are checked by the error detection circuitry. However, for other regions writing corrupt data to memory may be undesirable. For example, some regions may be defined as "device" regions which when written to trigger some action at a corresponding external device (e.g. firing of an airbag in a vehicle), and it may be undesirable for an error caused by a transient fault cause triggering of such an action (e.g. once fired a system reboot will not enable the airbag to be "unfired"). Therefore, in some cases store operations to "device" type regions of the address space could be held in a queue and committed to memory when the error detection circuitry has confirmed, based on the corresponding checker stream, that the original store operation of the main processor was error-free, while stores to other regions are committed to memory without waiting for the error detection.

Hence, at the most general level, commitment of store operations could be deferred until after the error checking has been performed for store operations with target addresses in at least one first region of an address space (which could be part of the address space or the entire address space in some embodiments). Similarly, commitment of store operations to memory could be triggered without waiting for error detection to complete if the store operations target addresses in at least one second region of an address space (which again could be just part of the address space or the entire address space). A rollback log can be used to record previous data values associated with addresses in the second region which are updated by stores before the corresponding error checks have completed, which can allow recovery if an error is subsequently identified.

The memory log entries could be updated at any stage of processing by the main processor at which the addresses and data values of the loads/stores are available. However, in examples where the main processor is an out-of-order processor while the checker processors are in-order processors, it can be useful for the memory log circuitry to be updated once the corresponding memory access is committed by the main processor. The point when the memory access is committed is the point when it is known that the memory access should definitely be performed (e.g. once the outcome of any preceding branch instructions have been resolved and any earlier operations generating results which affect the calculation of the store data value or the target address have themselves been committed). Since generally memory accesses will commit in program order, then even if the memory accesses are actually executed out of order by the main processor, updating the memory log at the commit stage means that the memory log entries track the memory accesses in the same order that they would be encountered by the in-order checker processors when performing the corresponding checker stream. This makes implementation of the checker processors and the memory log simpler as the checker processors can simply read out each entry of the memory log sequentially rather than having to perform a search of the entire entry for the required memory address. Note that at the point when the memory access itself is committed, this does not necessarily mean that the instruction which triggered that memory access is committed. For example, the memory access could be just one part of a compound operation triggered by the corresponding instruction, and while the memory access may have been committed, other parts of the memory access may still not be committed so that the instruction as a whole is considered to not yet have been committed.

In some examples, each checker stream may be executed by only one checker processor. In this case, if an error is detected, it may not be possible to determine whether the error occurred in the main processor or the checker processor, but either way the main processor may trigger a recovery operation just in case the main processor was erroneous. In practice, errors may be sufficiently rare that some unnecessary recovery operations may be tolerated to reduce the overhead of error checking.

However, in other examples, the same checker stream may be allocated to two or more of the checker processors. In this case, if one of the checker processors generates a different result to the main processor but the other checker processor matches the main processor, the error occurred in one of the checker processors and so there is no need to trigger an error recovery operation for the main processor. However, if each of the checker processors running the same checker stream agree on their results but differ from the main processor, then the error can be pinpointed to the main processor and the error recovery operation can be triggered. While this approach may require additional checker processors to be provided, for applications where it is particularly important to reduce the time for which the system is unavailable for processing the main stream, this additional overhead may be justified.

Alternatively, rather than allocating all checker streams to multiple checker processors, another approach can be to generally allocate a checker stream to a single checker processor, but if an error is detected for that checker stream, to repeat the checker stream on a second checker processor to resolve whether the error occurred in the main processor or the first checker processor. While sequentially performing the same checker stream on two or more checker processors may increase error reporting latency, this may be justified in order to avoid unnecessary reboots of the main processor for example.

In some examples, all of the checker processors may have identical micro-architectures, in which case a given checker stream can be allocated to any available checker processor.

However, in some cases it can be useful to include at least some checker processors with different micro-architectures. For example, at least one of the checker processors may support at least one type of processing operation which is unsupported by at least one other checker processor. In this case, if a portion of the main stream includes the at least one type of processing operation, the corresponding checker stream is allocated to one of the checker processors that supports that operation and cannot be allocated to one of the other processors. Some types of processing operation are relatively rare and so it may not be justified to provide hardware for supporting that operation in each of the checker processors. For example, some parts of the main stream may not include any floating-point operations and so only providing some of the checker processors with a floating-point unit may save circuit area and power without significantly affecting the error reporting latency.

In some examples, the checker processors may execute program instructions from the same instruction set architecture (ISA) as the main processor. However, often the area and power consumption of the checker processors can be reduced if the checker processors execute the checker streams according to a different instruction set architecture (ISA) to the main stream. Hence, the checker stream of instructions may not include exactly the same instructions as the corresponding portion of the main stream.

The checker processor ISA could be a partial subset of the main processor ISA, with the main processor supporting the execution of some types of instruction not supported by the checker processors. For example, a compound operation triggered by one instruction of the main processor ISA may be executed by the checker processors using a number of separate simpler instructions of the checker processor ISA which generate an equivalent result. Also, while the main processor ISA may support execution of vector instructions which control the processor to perform a number of independent lanes of processing in parallel on vector operands comprising multiple independent data elements in one register, the checker processor may only have scalar processing hardware and may execute the corresponding lanes of processing sequentially using scalar instructions of the checker processor ISA. Alternatively, the checker processor ISA could be entirely different to the main processor ISA, with the corresponding types of instruction in the two ISAs having entirely different encodings.

Different approaches can be used for generating the checker streams when the checker processors use a different ISA to the main processor ISA. In one example, the checker processors may execute checker binary code defining the checker streams, the checker binary code being independent of main binary code defining the main stream. Hence, entirely different binary code could be compiled for the main processor and checker processors respectively and both sets of binary code may be stored in memory for access by the respective main processor and checker processors. Alternatively, the checker processors may execute checker binary code defining the checker streams, which is obtained by runtime translation of main binary code defining the main stream. Using runtime translation can simplify the tool chain for developing the code running on the main and checker processors, and reduce the memory storage capacity required for storing the code to be executed. On the other hand, using separate binary code has the advantage that there is no need to certify that the runtime translation code for translating the main stream into the checker streams is itself "safe", which may be an important factor for certain safety-critical applications such as automotive.

The division of the main stream into portions to be checked by respective checker portions can be controlled in different ways. In some cases, each portions could simply correspond to a block of instructions of a fixed size or to the instructions processed in time periods of fixed duration.

However, the efficiency of the checker processors may be greater if the portions are of variable size depending on events occurring within the main stream being processed by the main processor. Hence, in one example each checker stream corresponds to a portion of the main stream executed by the main processor between two successive checking boundary events. Effectively the boundary events may mark points of the main stream at which it is desired to start a new checker stream. The register checkpoints are captured at each boundary event, and a new checker stream allocated following the boundary event.

Each checking boundary event could for example be one of the following events:

Occupancy of a memory log entry for tracking memory accesses performed by the main processor in response to the main stream reaching a threshold occupancy level or greater. Hence, when a given memory log entry is full or nearly full, this may trigger the end of the current portion of the main stream and the start of the next portion so that subsequent memory accesses can be tracked using the next memory log entry.

Occurrence of an exception event, which could be a software exception such as a divide by zero error or other event caused by the execution of the main stream by the main processor, or a hardware interrupt caused by an external event such as a user pressing a button on the device or a signal being received from an external device. Exception events can lead to significant changes in architectural state and so if an exception occurs part way through a portion of the main stream, then the checker processor may need to be able to identify the point at which the exception occurred in order to avoid false positive detection of errors. While exceptions could be tracked, e.g. by including entries recording the occurrence of exceptions in the memory log, it can be simpler to finish the current portion when an exception event occurs and start the next portion (which could correspond to the exception handler) to reduce the overhead of tracking exceptions. Similarly, returns from an exception handler to normal code could also be treated as an exception boundary event.

Detection of a control flow changing instruction in the main stream of program instructions executed by the main processor. Control flow changing instructions (e.g. branch instructions or other instructions which result in a non-sequential change of control flow within a program) may be subject to branch prediction in the main processor, and if there is a misprediction then the main processor may execute a series of instructions which later turn out should not have been executed. Hence, if the boundary between portions occurs at a control flow changing instruction, then if there is a misprediction the checker stream corresponding to the instructions following the control flow changing instruction may not need to be executed at all, if it turns out those instructions were not needed in the main stream. Hence, triggering the boundary event at a control flow changing instruction can help to simplify recovery from branch mispredictions and improve performance at the checker processors by avoiding executing unnecessary instructions.

Detection of a checking barrier instruction in the main stream of program instructions executed by the main processor. This can allow a programmer or compiler to force a boundary between checker streams by including the checking barrier instruction in the main stream of program instructions. For example, this can be particularly useful when the checker processors implement a different instruction set architecture (ISA) to the main processor as discussed above, as the barrier instruction can simplify mapping between corresponding points of the main stream and the checker stream in the different ISAs. Even if the main processor and checker processors use the same ISA, a barrier instruction could also be useful to signal points of execution at which it is particularly useful to include a checkpoint for error detection, e.g. because the next portion of the main stream will include a large number of memory transactions which could potentially corrupt memory. Barrier instructions can also be useful in environments where multiple threads share access to data, e.g. through a lock-based mechanism where one thread can lock access to a given data value to exclude other threads from accessing it until the lock has been relinquished. For example, a checking barrier instruction could be included at the end of the code which uses a locked resource, to force an error detection checkpoint just before the lock is given up and another thread can now access the data. This can help reduce the chance that errors propagate to other threads.

Detection of a predetermined type of instruction corresponding to an operation which is unsupported by at least one of the checker processors. As discussed above, some checker processors may not support every type of processing operation that can be performed by the main processor. In this case, when an instruction corresponding to one of the operations only supported on some processors is encountered, it can be useful to end the current portion so that the checker stream for the current portion is still able to be allocated to any of the checker processors regardless of whether they support that type of operation. For example, in embodiments where only some checker processors support floating point operations, this approach can be particularly useful since typically once one floating point operation is encountered it is likely that a number of following operations will also be floating-point operations, and so by starting a portion at the first encountered floating-point operation, it is more likely that the entire sequence of floating-point operations will fit within fewer portions of the main stream, to reduce the number of checker streams which have to be allocated to the checker processor supporting floating point operations. This can enable more efficient scheduling of the checker streams and increase utilisation of the checker processors, reducing the chance of stalls due to the relevant checker processors not being available to handle the required set of processing operations.

Detection that the instructions executed in the main stream since a previous checking boundary event correspond to at least a threshold amount of cumulative workload for one of the checker processors. The overall error detection latency can be reduced if the execution time for each checker stream is roughly equal. Some instructions executed by the main processor may correspond to more work for the checker processors than other instructions. For example, if the main processor supports processing of vector instructions but the checker processors execute the operation using a series of scalar calculations, one vector instruction of the main stream may correspond to a greater workload (execution time) for the checker processors than one scalar instruction of the main stream. In this case, for balancing the load for the respective checker streams a portion of the main stream containing a block of N-lane vector instructions could be halted after 1/N the number of instructions at which a portion containing basic scalar operations would be halted. Therefore, it can be useful to provide tracking of the amount of cumulative workload incurred so far for the checker processor in processing instructions corresponding to the current portion of the main stream, and trigger a checking boundary event when the cumulative workload exceeds a threshold. The tracking of the cumulative workload may be relatively inexact, and does not need to correspond exactly to the amount of execution time taken for each operation (which may vary from instance to instance in any case). For example, one way of implementing the tracking may be to provide a counter which is reset at a checking boundary and then incremented by 1 for each scalar instruction and by the number of vector lanes for each vector instruction, and to trigger the checking boundary event when the counter exceeds a threshold, and reset the counter on each checking boundary event. More generally, a given counter increment value (e.g. 1, 2, 3, . . . ) could be allocated to each type of instruction based on an estimate of the amount of workload involved in processing the corresponding operation for the checker processor, and this can be used to count cumulative workload and trigger a checking boundary event when the count reaches a threshold.

Elapse of a predetermined period since occurrence of a previous checking boundary event. A very long checker stream can be undesirable as it may tie up a checker processor for a significant period of time and increase the error reporting delay. In some applications, error checking may be required to be performed within a certain maximum latency, so to ensure that checker streams do not become too large it can be useful to define a timeout feature where even if none of the other types of checking boundary event occur, the current portion of the main stream is halted and a new checker stream allocated if a predetermined period has elapsed since the previous checking boundary event. The predetermined period could be measured in terms of number of elapsed processing cycles, elapsed time, or executed number of program instructions.

Hence, a range of different checking boundary events may be provided. Note that any particular embodiment need not implement all of these types of checking boundary event. A given embodiment may implement a subset comprising any one or more of these types of checking boundary event.

In some embodiments, the main processor may not be the only processor in the data processing apparatus, and there may be multiple processors which each need to be checked for errors. Hence, there may be two or more main processors each executing a respective main stream of program instructions. In some examples, each main processor could have its own dedicated set of checker processors, for executing checking streams for checking corresponding portions of the main stream executed by that main processor.

However, typically while a certain number of checker processors may be required to handle the peak load required for checking the main stream for errors, the average load on the checker processors may be lower than the peak load and so the checker processors allocated to a given main processor may often not be fully utilised.

Therefore, in an embodiment having multiple main processors, it can be more efficient to share a group of checker processors between the main processors, so that each checker processor of the group can execute a checker stream corresponding to a portion of the main stream executed by any of the main processors. This allows enough checker processors to be provided to handle the peak load for any one main processor, but the number of checker processors can be determined based on the average load for each main processor to reduce the number of checker processors provided in total.

Alternatively, a hybrid approach could be used where a given main processor has at least one checker processor which is dedicated to processing checker streams corresponding to that main processor, as well as a shared pool of checker processors being provided which can be used for executing checker streams for any of the main processors.

In some implementations the error detection circuitry may actually compare the outcome of the checker stream with the outcome of the corresponding portion of the main stream itself, and detect an error when the comparison detects a mismatch. Hence, the error detection circuitry may have hardware comparators for comparing the register state resulting from the checker stream with the register checkpoint state, and comparators for comparing store data against data in the memory log.

On the other hand, in other embodiments the comparison between the main stream outcome and the checker stream outcome may be performed in software by allocating a comparison stream to one of the checker processors. In this case, the error detection circuitry may detect the error based on the outcome of the comparison stream executed by a checker processor, and assert an error signal if the comparison detects a mismatch, but not actually perform the comparison itself. In such an embodiment, the error detection circuitry may include circuitry configured to cause the checker processors to execute a comparison stream in response to the completion of a checker stream being completed.

FIG. 1 shows an example of a data processing apparatus 2 comprising a main processor 4 for processing a main stream of program instructions. The main processor 4 in this example is an out-of-order processor comprising fetch and decode logic 6 for fetching the instructions from the instruction cache 8 and decoding the fetched instructions, and out-of-order execution hardware 10 supporting execution of the decoded instructions in a different order to the program order in which the instructions were fetched from the cache 8 by the fetch/decode logic 6. Commit logic 12 tracks which instructions have been executed and commits changes in architectural state caused by an instruction when any earlier instructions in the program order have been executed. The committed architectural state represents the last known safe point of execution to which processing can be rolled back in the event of branch misprediction for example. Out-of-order execution allows a later instruction to be executed ahead of an earlier stalled instruction which is awaiting operands to become available if the later instruction is independent of the stalled instruction, enabling higher performance than in an in-order processor. It will be appreciated that FIG. 1 shows the out-of-order pipeline at a high level and any known design of out-of-order pipeline may be used for the main processor 4. It will also be appreciated that the main processor is not limited to being an out-of-order processor, and that it can be any type of processor that is capable of processing instructions at a higher rate than the checker cores 20, for example a superscalar in-order processor.

The apparatus 2 also comprises a group of checker processors 20 for checking errors in the main stream processed by the main processor 4. Each checker processor 20 supports processing of instructions with a lower maximum instruction throughput than the main processor 4. For example, each checker processor 20 may be a smaller processor which has lower power consumption and less circuit area per unit of computation than the main processor 4, but which operates at lower performance so that a given amount of processing workload takes longer to complete on a checker processor 20 than on the main processor 4. For example, the checker processors 20 may have fewer pipeline stages than the main processor 4, and could have fewer (or less complex) performance enhancing features such as branch prediction. The checker processors 20 may be in-order processors.

The apparatus 2 also has register checkpoint circuitry 24 for storing sets of architectural state data captured from registers of the main processor 4 at regular or irregular intervals, and memory log circuitry 26 for tracking the addresses and data values of memory accesses performed by the main processor 4 during processing of the main stream. In the example of FIG. 1, each checker processor 20 has a corresponding entry in the register checkpoint circuitry 24 and a corresponding entry in the memory log 26, although other embodiments could provide for some spare entries. In the example of FIG. 1, the register checkpoint circuitry 24 and memory log circuitry 26 use a combined storage structure, but the register checkpoint circuitry 24 and memory log circuitry 26 could also be split into separate structures. In some embodiments it may be possible to reduce the area required by sharing the register checkpoint hardware 24 with the register files in the checker processors 20. It will therefore be appreciated that FIG. 1 only illustrates the concept and other embodiments could use a different arrangement of circuitry to implement the technique.

Figure 2:
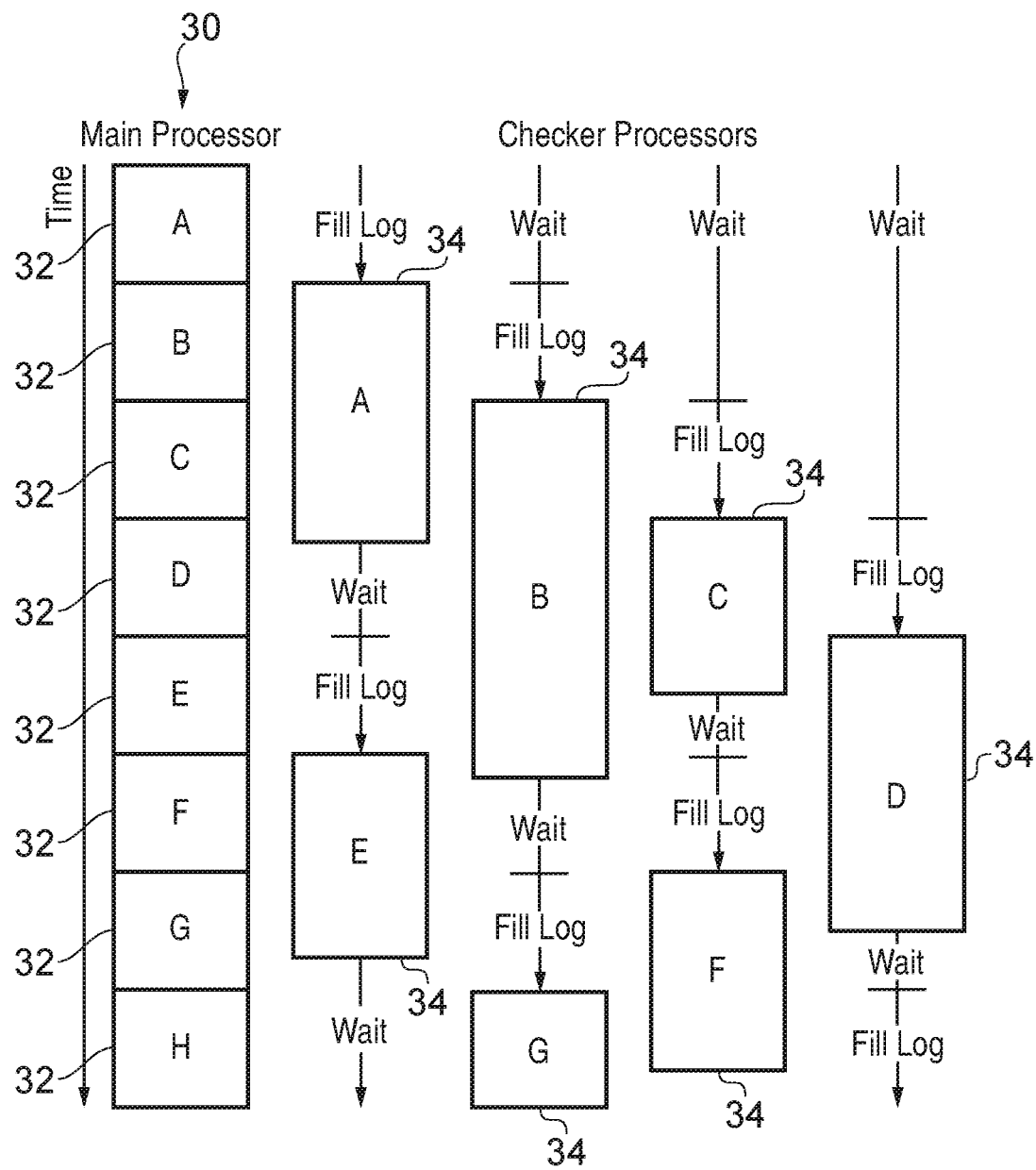

Control circuitry 22 controls the allocation of checker streams of program instructions to the respective checker processors 20. As shown in FIG. 2, the main stream 30 of program instructions executed by the main processor 4 is divided into portions 32. While FIG. 2 shows an example where each portion 32 is of the same size, this is not essential and some embodiments may use variable size partitions where the boundary between portions is triggered when one of a number of checker boundary events occur as mentioned above. When the main processor 4 starts processing a given portion of the main stream 30, the control circuitry 22 selects an available checker processor 20, and starts to fill that checker processor's corresponding entry of the memory log circuitry 26. When the end of the portion 32 is reached by the main processor 4, a snapshot of the current architectural state of the main processor 4 is taken and stored to one of the register checkpoint entries 24. The selected checker processor 20 then starts to process a checker stream 34 of program instructions corresponding to the recently completed portion 32 of the main stream 30. As the checker processor 20 operates with lower performance than the main processor 4, it will take longer to complete the corresponding operations. When the checker processor 20 reaches the end of the checker stream 34, error detection circuitry 28 compares the resulting architectural state of that checker processor 20 with the snapshot of architectural state stored in the corresponding register checkpoint circuitry 24. If the comparison detects a mismatch, the error detection circuitry 28 signals that an error has occurred, which can trigger a recovery operation such as restoring previous architectural state to the main processor 4 from an earlier point of program execution, or triggering a system reboot. Also, during the processing of a given checker stream 34, the error detection circuitry 28 also triggers an error signal if the data value associated with a store operation is different to the data value recorded for the same address in the memory log circuitry 26.

As shown in FIG. 2, multiple checker processors 20 are provided for executing respective checker streams 34 in parallel with each other, so that even though each checker processor 20 is slower than the main processor 4, the collection of checker processors 20 as a whole can check different portions of the main stream 30 for errors in parallel so that the checker processors can keep up with the execution rate of the main processor. In other words, an array of much smaller checker processors 20 can be used for fault detection of a main processor 4 by parallelising the execution of the duplicate error detection task. This is done by splitting up execution based on register checkpoints from the main processor. Each section can then be run again, concurrently on several small checker processors. Because the duplicate execution for fault detection can be parallelised across many tiny processors, the efficiency of the execution of the duplicate task, both in terms of area and power is many times better than a dual-core lockstep approach. For example, a calculation using typical area and power consumption figures for a typical microcontroller and out-of-order processor indicate that the additional overhead of the group of checker processors 20 as a percentage of the area/power consumption of the main processor 4 would be around 10-20%, as opposed to 100% for a dual core lock step system.

FIG. 2 shows an example where shows each checker processor 20 starts to execute its checker stream after the corresponding portion of the main stream has completed on the main core. An advantage of this approach is that it is simpler to implement the comparison logic for comparing memory operations with the load/store log 26.

However, an alternative approach for reducing error detection latency can be to start the checker processor 20 executing a checker stream when the main processor 4 starts executing the corresponding portion of the main stream (with the portion of the main stream and the corresponding checker stream executing in parallel). With this approach, the checker processor 20 can reach a memory operation that has not yet been allocated to the load/store log 26 (e.g. if the main processor 4 encountered a cache miss so has not yet been able to update the log). In this case, the logic for comparing memory operations performed by the checker processor 20 with the memory log 26 may output a "not ready" indication if the required entry of the load/store log 26 was not available at the time the checker processor 20 reached the corresponding memory operation. If a checker core receives a "not ready" indication it may stall its execution until the log entry is available. Alternatively for store operations the data value and address of a store operation in the checker stream for which the corresponding memory log entry was not ready can be stored in a small storage structure, and compared with the memory log entry later when the memory log entry does become available.

In the example of FIG. 1, the checker processors 20 have a separate instruction cache 40 to the L1 instruction cache 8 used by the main processor 4, and do not access a data cache as the results of load operations from a L1 data cache 42 by the main processor can be forwarded to the checker processors 20 via the memory log 26 by storing the data and addresses of loads in the relevant entry of the memory log 26. A shared L2 cache 44 may be provided for storing data accessed by the main processor 4 and instructions executed by either the main processor 4 or the checker processors 20. Also the checker processors could each have their own cache.

However, another approach that would reduce the size of memory log 26 would be to only log store operations in the memory log 26, and allow the checker processors 20 to independently retrieve load data from a cache. In this case, the checker processors could have a separate data cache from the L1 data cache 42 of the main processor 4. However, in practice as the execution of the tiny checker processors shadows that of the main processor the data required by the checker processors is likely to be available in the L1 data cache 42 of the main processor 4 or other nearby cache such as the shared L2 cache 44, and so it may be more efficient for the checker processors 20 to simply share the same data cache(s) used by the main processor 4.

This approach of not logging load operations in the memory log 26 could raise false positive errors if the main processor performs a store to the data in the cache before the checker processor has performed the load. This may be acceptable to reduce the complexity of the memory log 26 if such errors are sufficiently rare. However, to work around this problem a hybrid approach could be used where the log 26 does not normally hold load data, but a copy on write technique is used to add load data for selected loads to the log when required.

Figure 3:
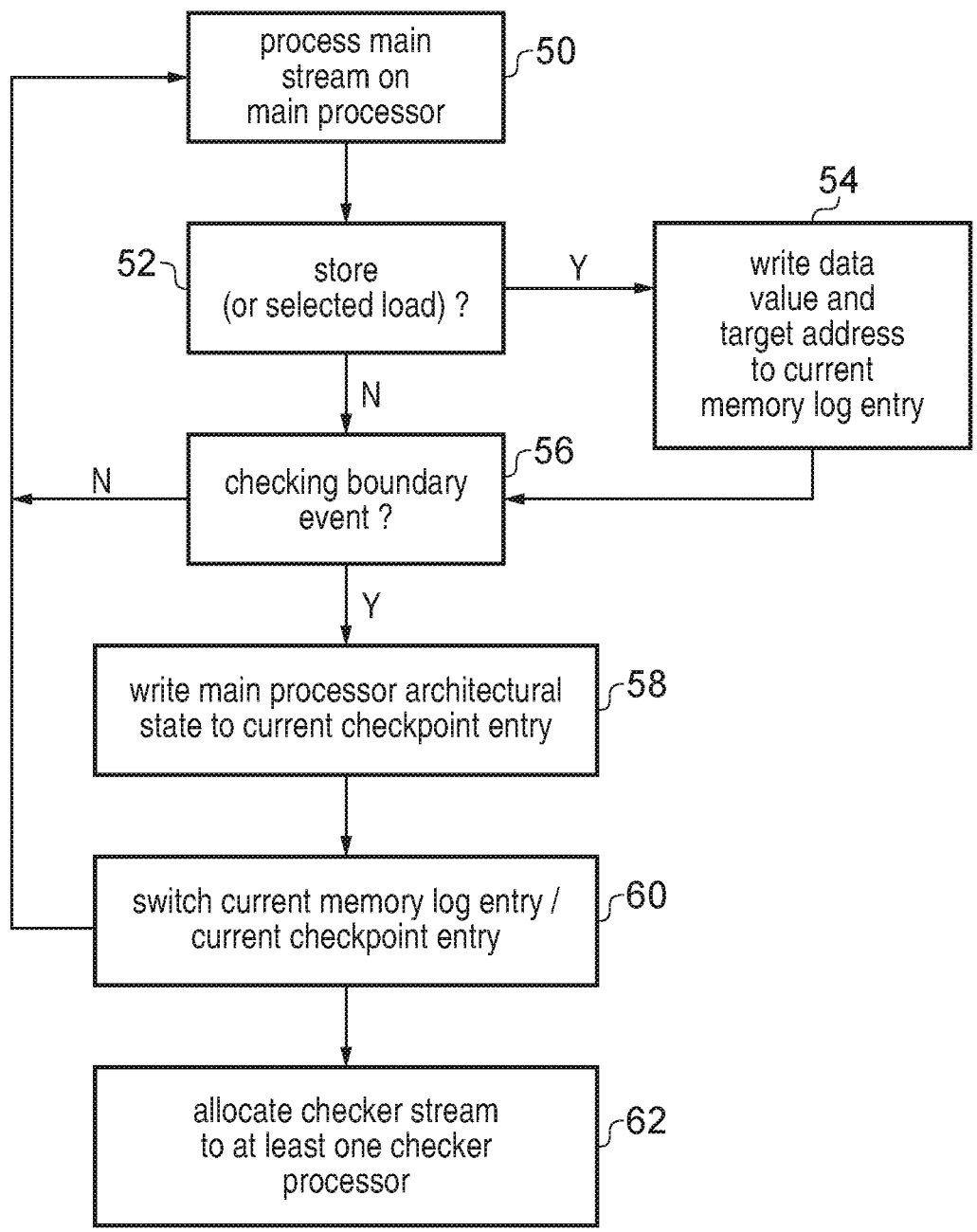
FIG. 3 is a flow diagram illustrating a method of processing the main stream with the main processor.

FIG. 3 is a flow diagram illustrating a method of processing the main stream on the main processor 4. At step 50 the main processor 4 starts processing of instructions from the main stream. At step 52 the main processor 4 determines whether a store instruction (or in embodiments where all or some loads are tracked, a selected load operation) has been committed by the commit logic 12. If so, then at step 54 the data value stored or loaded and the target address of the memory access are written to a current memory log entry 54 being filled for the current portion 32 of the main stream 30. If the committed instruction is not a store or selected load, step 54 is omitted. In another embodiment the target address may only be stored in the memory log 26 entry for store operations. If the address of the load is incorrect, but the value returned by the load is correct the system will still function normally, so such errors do not need to be detected. This can reduce the amount of storage required in the memory log 26.

The method then proceeds to step 56, where it is determined whether a checking boundary event has occurred. The checking boundary event could be any of the types of boundary event mentioned above. If no checking boundary event has occurred, the method returns to step 50 to continue processing of the main stream. If a checking boundary event occurs then at step 58 the main processor reads architectural state data from its internal registers and writes the read state data to a current checkpoint entry of the checkpoint circuitry 24. For example, the state may include register data, control data such as a program counter, stack pointer or function return address, indication of a current processing mode, etc. At step 60 the checker allocation control circuitry 22 switches which register checkpoint entry and memory log entry is the currently filled entry, with the newly selected entry being one that corresponds to an available checker processor 20. At step 62 the control circuitry 22 triggers the checker processor corresponding to the previously selected entries of the register checkpoint circuitry 24 and memory log 26 to start processing a checker stream corresponding to the recently completed portion of the main stream. Meanwhile, the method continues to step 50 to continue processing of the next portion of the main stream 30.

It will be appreciated that instead of performing step 58 to write the main processor state to the register checkpoint after the checking boundary event occurred, checkpointing the register state may alternatively be performed continuously throughout the processing of the portion of the main stream 30. In this case the register checkpoints 24 would be updated when each instruction executed by the main processor is committed. If a checkpoint boundary event is encountered at step 56 the current register checkpoint would already contain the architectural state and the checkpoint boundary event would simply trigger selecting the next register checkpoint by proceeding to step 60, omitting step 58. Such an embodiment may be easier to implement as less work needs to be performed when checkpoint boundary events are encountered.

Figure 4:
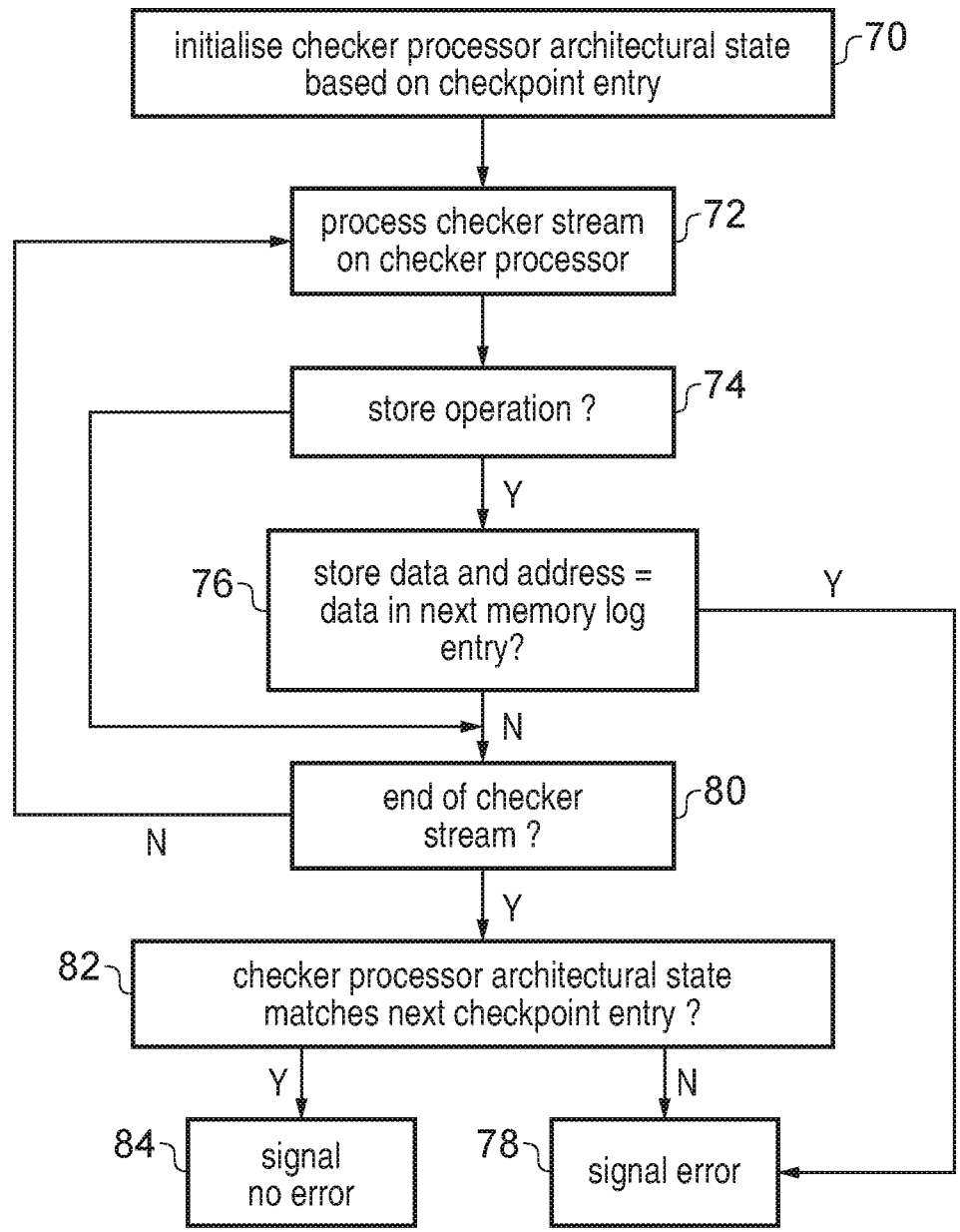
FIG. 4 is a flow diagram illustrating a method of processing a checker stream with one of the checker processors and detecting errors.

FIG. 4 shows a flow diagram illustrating processing of a checker stream by one of the checker processors 30. At step 70 the checker processor is initialised with the architectural state from the checkpoint entry defining the register state at the start of the corresponding portion of the main stream. At step 72 the checker stream starts being processed by the checker processor 20. At step 74, it is determined whether the checker processor 20 has encountered a store operation. If so, at step 76 it is determined whether the data value associated with the store performed by the checker processor 20 matches the data and address stored in the next entry of the memory log 26, and if there is a mismatch then at step 78 the error detection circuitry 28 signals an error. If the store data and address matches the memory log at step 76, or no store operation was encountered, then at step 80 it is determined whether the end of the checker stream has been reached. If not, processing of the checker stream continues at step 72. On completion of the checker stream, at step 82 the error detection circuitry compares the state of the checker processor with the state shown in the next checkpoint entry (the entry following the checkpoint entry used to initialise the checker processor at step 70), and if there is a match no error is signalled at step 84 and so the corresponding portion of the main stream is verified as free from errors. If a mismatch between the checker processor's architectural state and the state stored in the next checkpoint entry is detected, then at step 78 an error is again signalled.

Note that while in general the number of register checkpoints 24 may correspond to the number of checker processors 20, whether it is the checkpoint entry used to initialise the checker processor at step 70 or the checkpoint entry which stores the state to be compared at the end of the checker stream at step 82 which is considered to be the entry corresponding to that processor 20 is an implementation choice, and either approach can be used. Hence, in the first case, a given checker processor is initialised using its own entry of the register checkpointing circuitry and the comparison uses the state data stored in the entry corresponding to the next selected checker processor. In the second case, a given checker processor is initialised using the previously selected checker processor's entry and then the comparison at step 82 uses that checker processor's own entry of the checkpoint circuitry 24.

In some cases, the checker processors 20 may execute the same ISA as the main processor. However, even if the ISA is the same, the checker processors 20 may have a different micro-architecture to the main processor 4, for example the checker processors 20 may not support full width vector execution and instead the checker processors could execution the lanes of a vector instruction sequentially. To compensate for this and keep the execution time of each checker stream 34 by the checker processors roughly equal, the sizes of the portions 32 can be varied depending on the amount of work performed. For example, a portion 32 of the main stream that entirely consists of 4-lane vector operations might contain ¼ of the instructions as a block that just contains basic integer instructions. This approach of scaling the size of the blocks depending on the resource of the checker processors 20 could also be extended to handle other microarchitecture differences. For example, a smaller block size could be used if the checker processors 20 do not have a pipelined floating-point multiply-accumulation ALU and a floating-point multiply-accumulate instruction is executed in the main stream 30.

Also, the microarchitecture of each checker processor 40 could be different. Hence, not all the checker processors need to support every possible operation which can be performed by the main processor 4. For example, not all checker processors would have to support floating point operations. In this case only checker streams that do not contain floating point instructions would be assigned to the checker processors without floating point units. To help reduce the proportion of portions 32 that contain a floating-point instruction a portion could be terminated early if it was close to its natural end point when an floating-point instruction is encountered for the first time within that portion.

To further reduce the area of the checker processors 20 it is possible for them to run a different ISA to the main processor 4. This can either be a cut down version of the ISA on the main processor 4, or a completely separate ISA. This could be handled in several different ways:

- a run-time translation approach could be used to translate the code running on the main processor 4 to the ISA required for the checker processors 20. The translation code may run on the main processor 4 as a separate thread from the main stream 30 itself.
- The tool chain used to generate the code for the main stream 4 could compile the software twice targeting the different ISAs. In the more tightly controlled environments (e.g. automotive applications) for which fault detection is required, this approach may be preferred to eliminate needing to certify the translation code as safe.

To simplify mapping between the two compiled binaries it can be useful to implement a checking barrier instruction that could be executed on the main processor 4 that would force a checkpoint between portions 32. Providing a checking barrier instruction would also enable the dynamic sizing of the blocks to be performed at compile time, reducing the amount of work that needs to be performed by the hardware (this would also be an advantage even in embodiments which run the same ISA on the checker processors 20 as the main processor 4).

By holding store operations at the commit stage 12 of the main processor 4 until the checker processors have reached the associated instruction it is possible to use the register checkpoints 24 as a recovery mechanism when an error is detected. Alternatively, to reduce the complexity of the load-store forwarding hardware required a hybrid approach may be used where stores to a first region of memory (e.g. device-type memory) are held at the commit stage, while stores to a second region of memory (e.g. normal memory) trigger a copy on write technique that is used to fill a roll back log.

Figure 5:
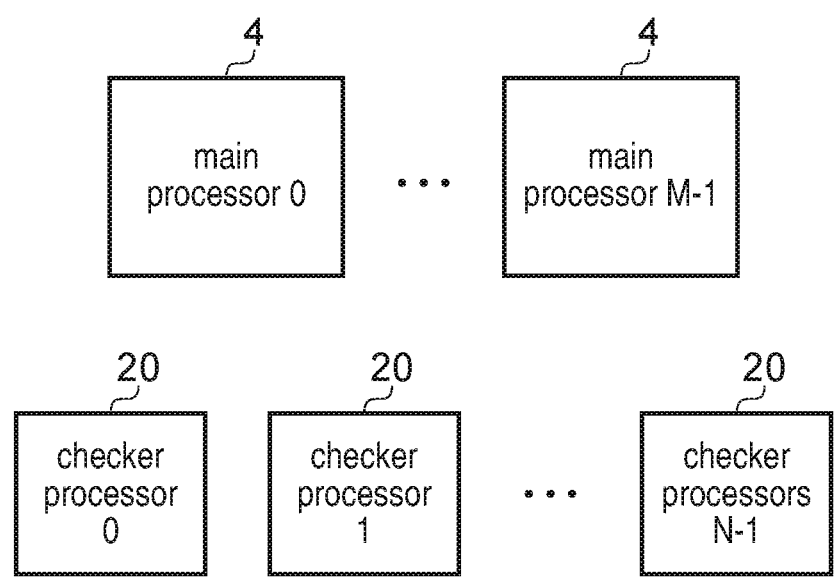
FIG. 5 illustrates an example of sharing checker processors between a cluster of main processors.

The peak load on the checker processors is typically higher than the average load. To reduce the need for over provisioning the checker processors a pool of checker processors 20 could be shared between a cluster of two or more main processors 4 as shown in FIG. 5. FIG. 5 shows an example with M main processors 4 and N checker processors 20, where N>M. If a given number A of checker processors 20 are required to satisfy the peak load of a single main processor 4, sharing the checker processors 20 between the main processors 4 so that each checker processor 20 may be used to execute a checker stream from any of the main processors 4 can enable the error checking to be performed with N<A*M checker processors 20, as it is unlikely that all of the main processors 4 would encounter their peak load simultaneously and the average load is likely to be smaller.

More specific details of a particular embodiment are set out below.

Motivation

To achieve low power consumption and low chip area fault detection while supporting error detection for relatively high performance processors, we provide a way to parallelize the fault detection computation. This would be trivial if the original computation exhibited thread-level parallelism: we could split both the workload and detection onto a set of simple cores. However, typically the main applications to be checked for errors are running on large out-of-order cores, as they exhibit little thread-level parallelism, and are primarily sequential.

However, it is still possible to parallelize the error detection, even if the original program is sequential. We can use the principle of strong induction to check multiple parts of the executed program at once. That is, we can check a given part of the program assuming all previous parts were correct. Provided we then prove this for each part of the program, it is possible to prove the entire program to be free of hardware faults.

This means, computationally, we can overlap each of these checks and run them on multiple low-power cores, as shown in FIG. 2. In practical terms, we can split computation by taking periodic register checkpoints from the original computation core, and using those to spawn checker threads, which repeat the computation between two checkpoints, and are allowed to overlap. As the computation has already been completed once, and the checker threads are repeating redundant computation, we can for the purpose of each individual check assume a register checkpoint is correct. As memory values have already observed, there are further no race conditions between the threads: we can store the load and store values from each segment individually, allowing the checker threads to both read the same memory values, and check the addresses and values of stores. Once each check is completed, we can check the newly computed register file against the one taken at the end of that particular segment from the original computation.

If a check fails, even if a future check was successful we cannot prove the later computation was correct. This is because the assumption of correctness of previous parts of the computation, required for the strong induction hypothesis, does not hold. Correctness is known once all checks up to a given point are completed. Similarly, if an error is detected within a check, we do not know it was the first error until all previous checks are completed. Still, such a system gives us enough power to identify that an error has occurred, and the position of the first error, giving a practical error detection mechanism.

Overview

FIG. 1 gives an overview of our system. We attach a collection of micro-controller sized cores to an out-of-order processor, in order to repeat the computation from the original core efficiently. The loads and stores performed by the main core are stored in a hardware load-store log, which is split up into multiple segments, each checked by a different micro-controller in parallel. The micro-controllers are also given a copy of the register file at the start and end of each segment, to start execution from.

Memory blocks such as caches and DRAM can be protected by another scheme such as error correction codes (ECC), so that they do not need to be duplicated: the detection scheme using the checker processors just covers errors within the core. In some embodiments, the instruction stream is read only, such that the instructions read by checker units will be identical to those read by the main thread. This is a common design choice, but even if writing of the instruction stream is required, this can also be accommodated by requiring that any checking of previously executed instructions is completed before the instruction stream is modified.

Some embodiments provide a scheme that provides only detection, rather than correction, of soft and hard errors. Detection of an error may trigger an exception within a program, which can either be caught and handled, or may trigger termination of the program. Incorrect values may be allowed to propagate into main memory and devices on a detected error: the exception trigger's semantics can be designed to take this into account to include reporting of errors to other devices or threads.

The scheme discussed below is a hardware scheme in which error detection is done without modification to the original program. In the example given below, the same code can be run on the micro-controllers as on the main core: the differing behaviour in terms of load and store checking, and stopping on reaching a register checkpoint, can be achieved using hardware logic. However, as mentioned above other examples may implement different ISAs on the checker processors 20 compared to the main processor 4, but even in this case there is no need for the main processor 4 or checker processors 20 to execute instructions for reading the memory log and register checkpoints or comparing the register state to detect errors—this can be done using hardware logic.

Micro-Controllers

Multiple micro-controller sized processing units 20 are attached to the main out-of-order core, in order to run the redundant fault detection code. We require multiple of them to be able to keep up with the main core: for power and chip area reasons, they are smaller, in-order, and run at a lower clock speed than the out-of-order core. In this example, in order to be able to run the same instruction stream as the out-of-order core, each micro-controller executes the same instruction set architecture as the main core. However, as the only state that needs to be checked for correctness is architectural, micro-architectural implementation specifics are allowed to differ.

As the micro-controllers 20 perform the same work as the main core, many of the instructions read are likely to already be in the L2 cache. The micro-controllers are also likely to share code with each other. These factors, along with a limited area budget for instruction caches, result in an efficient cache structure being a shared L1 cache 40 for the micro-controllers connected to the L2 cache 44 of the main core, along with a set of very small L0 instruction caches for each micro-controller. As the micro-controllers only access data from a log rather than main memory, and all accesses to this structure are sequential, no data cache is necessary.

When a stream of loads and stores is collected, along with architectural register checkpoints at the start and end of the stream, a micro-controller is started with the corresponding program count from the starting register file. The original instruction stream is then run, only with different behaviour for loads and stores: instead of reading from caches or main memory, a load instead looks at the next value in the log of loads and stores from the main core, then returns the originally loaded value. On a store, hardware logic checks both the address and stored value to ensure they are the same. If the store checks fail, an error exception is raised for the main core.

A micro-controller stops execution when the stream ends. At this point, the register file is checked for consistency with the architectural register file taken at the end of the original stream, and then the micro-controller is placed in a power saving state until another stream is ready to be checked.

Partitioned Load-Store Log

Both the main core and the checker cores read from the same addresses in memory. However, as the checker cores execute the same code later than the main core, the values, if read from main memory itself, may differ. We therefore forward the results of loads from the main core into an SRAM log, for the micro-controllers to read.

We further use the same structure to store the addresses of loads, along with the addresses and values of stores. These are checked against the ones computed by the micro-controllers to detect errors in execution.

The above information is collected in hardware, when the loads and stores on the out-of-order core commit. It is then stored into an SRAM: as the data is both stored and read sequentially, it could also be stored into main memory without significant penalty, but to simplify the design the data can stay on-chip. By collecting the data at commit time, the data is stored in the order it will be used on the in-order micro-controllers: to check a load or store, the next entry in the log simply needs to be read.

The load-store log 26 is partitioned so that different parts of the log can be checked simultaneously by multiple micro-controllers 20. We do this by storing architectural register checkpoints from the main core whenever a segment of the load-store log is filled. We then start a micro-controller with the register checkpoint collected when the previous segment was filled. When a check completes, the relevant segment of the log is freed to be used again. If all segments of the log are full, the main processor is stalled until one of the micro-controllers finishes, and clears its queue. As shown in FIG. 2, there is a one-to-one correspondence between micro-controllers and load-store log partitions. This simplifies the data paths, so that no arbitration is required between logs and cores. However, it also means that either one of the micro-controllers 20 or the main core 4 is always stalled, as otherwise there is nowhere for the main core to write its loads and stores to. As each micro-controller 20 is relatively small, it is likely preferable to include the extra core over having a complicated indirection layer which would increase wiring.

Size of Load-Store Log

Though we wish to divide the load-store log into multiple segments to attain checking parallelism, the size of the log represents a tradeoff. Each time we fill a segment, an architectural register checkpoint is taken of the main core, involving copying a large set of registers. To make this cost negligible, we can reduce the frequency at which this occurs. We can either do this by reducing the number of segments, at the cost of reducing the amount of parallelism, or by increasing the size of the load-store log 26, such that each segment is larger. This increases the on-chip storage requirements, along with the error detection latency: as each segment is longer, a micro-controller will take longer to check it, and thus longer to report any error.

Memory System

Our scheme results in increased latency between the original execution and checking of a given instruction, compared with a lock-step scheme: this is incurred to achieve parallelism. This means that holding back stores until they have been checked may be infeasible: adding an indirection table for load-store forwarding for this number of stores would slow down the common case of error-free execution. We can therefore instead allow potentially faulty stores to escape into memory. This does not alter the error properties of the system: even if we were to achieve fault tolerance through checkpointing, it is no better to allow only correct results to commit to memory, as these too need to be undone to return to a checkpoint.

However, this does mean that errors can propagate to other threads, and indeed other devices, if we allow errors to propagate to 10 systems as well as main memory. Instead of attempting to track the flow of incorrect data, the software to which errors are reported as exceptions can deal with reporting the error to any devices it has communicated with.

Interrupts

For the pattern of loads and stores seen between the main core and checker cores to be identical, interrupts should also be seen at the same point in the code on the checker cores as they were on the main core. There are alternative solutions to this: one is to insert interrupt events into the load-store log 26 when they reach the commit stage of the main core's pipeline. Another is to split checks based on interrupts, and issue an early register checkpoint on the interrupt boundary. The latter solution may slightly reduce queue occupancy, but it is simpler to implement.

System Faults

The error detection scheme assumes that errors are reported to the program itself. However, some errors can cause early termination of a program before they are checked, such as segfaults. To avoid this, we hold back the termination of processes until the checker cores have finished execution. If the check succeeds, we terminate the program. Otherwise, we issue a fault error, to be dealt with by the program.

Over-Detection

The addition of redundant logic causes more errors to occur within a system by necessity: more components exist, each of which can introduce new errors. However, errors within the checker circuitry would not affect the main program were they not reported. Still, since we cannot verify which of the main core and checker core produced an incorrect result, we still report the error.

One solution to this is that, on the detection of an error, the check is repeated on a different micro-controller unit. If neither check agrees with the main core, only then do we flag an error. This would reduce the false positive rate at the expense of added latency. We could also run two copies of the check simultaneously on different micro-controllers: this would require more microcontrollers total, but reduce latency. However, assuming errors are rare, neither of these solutions may be necessary: we may just wish to report the potentially false error to the system.

For our system to catch errors, we check loads and stores, and also the register checkpoints at the end of each check. As register state is never visible outside of the processor, one may think that it is not necessary to check the register state for errors. However, the ability to check from multiple locations in parallel relies on an induction hypothesis: each individual check verifies that loads and stores are correct, assuming the register file and previous loads and stores were correct up to that point. By checking the register file at the end of each checkpoint, we can combine each individual check to cover the whole program.

However, registers which are checked for errors may not impact any future loads or stores: they may be overwritten before being used again, for example. However, since the liveness of the register is only made evident in a future partitioned check, it may not be possible to calculate this, and so it can be preferable to report an error even if it would not actually cause problems in future iterations. However, note that we do not need to check all register errors: as long as a register error doesn't affect either the register file at the end of each partition, or any loads or stores, it cannot affect the correct execution of the program. Therefore, the false positive rate can be reduced by increasing the size of each partition, at the expense of increased detection latency and storage requirements.

Error Coverage

As the checking is done on separate hardware from the initial computation, our system can successfully cover both soft and hard faults. By covering loads and stores, the checker core covers all externally visible state from the processor. The values of loads from the memory system, however, aren't duplicated: as we use the load-store log to forward results observed by the main core, any error in the initial load will propagate. To protect against errors in the load-store log 26, error correcting codes (ECCs) can be used to protect the load data in the log, so that we have information redundancy to cover errors. Similarly, errors within the memory system are not covered by redundancy on the processor: we can use ECC on the main memory and cache system, to cover such faults.

Timeouts

While the condition to start and end checks of a load-store stream being the filling and emptying of a segment of the load-store log 26 is useful from a utilization and fixed storage space point of view, there are cases when we may wish to trigger detection early. For example, the main core could have erroneously entered an infinite control flow loop with no loads or stores, meaning no new checks would be issued. Similarly, the checker core may have done the same under an error affecting the checker core, meaning the check would never complete.

To solve the former problem, we can introduce a timeout value: the condition for issuing a check then becomes either filling the load-store queue segment or reaching a maximum number of instructions. To solve the latter, we can record the number of instructions committed in each segment. We then check against the register file when either all loads and stores have been checked in the load-store log segment, or when the number of committed instructions is equal to the number committed on the original core.

The same solution can be used to trigger an early detection, for example on an interrupt, a branch instruction, a barrier instruction, etc. as mentioned above.

Load Forward Duplication

Loads are forwarded from the main cores to the micro-controllers via the load-store queue. If an error occurs while the data is in the load store queue, it will be detected by the checking cores provided it causes any stores or the register file at the end of each checkpoint to differ. However, if an error occurs to a loaded value in a physical register in the main core, before the instruction is retired, the error can be duplicated to the checker core. A solution to this is to add a load duplication table: loads from the cache are stored in the load duplication table, and checked at commit time. If the loaded values are different, an error is triggered. As speculative loads can go into this queue, each load is tagged with an ID based on the instruction: loads with IDs earlier than the currently retiring instruction can be safely removed from the table.

Other Modifications

As well as load and store addresses and data, it is also possible to store further information in the load-store log 26 to improve performance of the micro-controllers 20. For example, provided the execution was correct, branch information will be identical between the checker cores and the main core. It is therefore possible to use this information as a branch oracle for the checker cores, to provide some performance improvement at the micro-controllers 20. Also, the memory log 26 could store the targets of branches: this would allow the log 26 to function as a very effective instruction prefetcher, potentially reducing instruction cache requirements for the microcontrollers.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   a main processor to execute a main stream of program instructions;
   a plurality of checker processors to execute respective checker streams of program instructions in parallel with each other, the checker streams corresponding to different portions of the main stream executed by the main processor; and
   error detection circuitry to detect an error when a mismatch is detected between an outcome of a given portion of the main stream executed on the main processor and an outcome of the corresponding checker stream executed on one of the plurality of checker processors.

2. The apparatus according to claim 1, wherein the main processor is capable of processing program instructions with a greater instruction throughput than each of the checker processors.

3. The apparatus according to claim 1, comprising checkpoint circuitry to store a plurality of checkpoint entries, each checkpoint entry indicative of architectural state of the main processor captured in response to a respective checking boundary event during execution of the main stream.

4. The apparatus according to claim 3, wherein for each checker stream:
   the respective checker processor is configured to commence processing of its respective checker stream using architectural state indicated by one checkpoint entry of the checkpoint circuitry, and
   the error detection circuitry is configured to detect an error when a mismatch is detected between architectural state generated by the respective checker processor in response to its respective checker stream and architectural state indicated by a next checkpoint entry of the plurality of checkpoint entries.

5. The apparatus according to claim 3, and wherein the error detection circuitry is responsive to detection of the error to trigger an error recovery operation based on one of the checkpoint entries of the checkpoint circuitry.

6. The apparatus according to claim 1, comprising memory log circuitry to capture a plurality of memory log entries, each memory log entry comprising tracking data indicative of data values and addresses of memory accesses triggered by the main processor during a corresponding portion of the main stream.

7. The apparatus according to claim 6, wherein the memory log circuitry is configured to capture memory log entries comprising at least tracking data for one of:
   store operations only;
   both load operations and store operations;
   store operations, and one or more selected load operations where the address associated with the load is marked as non-cacheable;
   store operations, and one or more selected load operations where the load operation was marked as a non-temporal access; and
   store operations, and one or more selected load operations for which the main processor has executed a subsequent store operation for the same address before a checker processor has executed the corresponding load operation in the checker stream.

8. The apparatus according to claim 6, wherein each checker processor is configured, when performing a load operation during processing of one of the checker streams, to obtain a data value to be loaded from a corresponding memory log entry of the memory log circuitry.

9. The apparatus according to claim 6, wherein the error detection circuitry is configured to detect whether an error has occurred for a given store operation in dependence on whether a data value to be stored for a given address by one of the checker processors matches the data value recorded in a corresponding memory log entry for said given address.

10. The apparatus according to claim 9, wherein the main processor is configured to defer committing a memory transaction to a memory in response to a store instruction targeting an address in at least one first region of an address space, until the error detection circuitry has detected whether an error occurred for that store instruction.

11. The apparatus according to claim 9, wherein the main processor is configured to commit a memory transaction to a memory in response to a store instruction targeting an address in at least one second region of an address space before the error detection circuitry has detected whether an error occurred for that store instruction.

12. The apparatus according to claim 11, wherein in response to the store instruction targeting a given address in said second region, the main processor is configured to record a previous value associated with the given address in a rollback log.

13. The apparatus according to claim 6, wherein the main processor comprises an out-of-order processor, the checker processors comprise in-order processors, and the memory log circuitry is configured to update one of the memory log entries to indicate the data value and address of a given memory access instruction when the given memory access is committed by the main processor.

14. The apparatus according to claim 1, comprising control circuitry to allocate the same checker stream to two or more of the checker processors.

15. The apparatus according to claim 1, wherein at least one of the checker processors is configured to support at least one type of processing operation which is unsupported by at least one other checker processor.

16. The apparatus according to claim 1, wherein the checker streams comprise program instructions defined according to a different instruction set architecture to the program instructions of the main stream.

17. The apparatus according to claim 16, wherein the checker processors are configured to execute checker binary code defining the checker streams, the checker binary code being independent of main binary code defining the main stream.

18. The apparatus according to claim 16, wherein the checker processors are configured to execute checker binary code defining the checker streams, the checker binary code comprising translated binary code obtained by runtime translation of main binary code defining the main stream.

19. The apparatus according to claim 1, comprising a plurality of main processors to execute a plurality of main streams of program instructions;

wherein the plurality of checker processors are shared between the plurality of main processors to execute checker streams corresponding to different portions of the plurality of main streams executed by the plurality of main processors.

20. The apparatus according to claim 1, wherein each checker stream corresponds to a portion of the main stream executed by the main processor between two successive checking boundary events.

21. The apparatus according to claim 20, wherein each checking boundary event comprises one of:
occupancy of a memory log entry for tracking memory accesses performed by the main processor in response to the main stream reaching a threshold occupancy level or greater;
occurrence of an exception event or exception return;
detection of a control flow changing instruction in the main stream of program instructions executed by the main processor;
elapse of a predetermined period since occurrence of a previous checking boundary event;
detection of a checking barrier instruction in the main stream of program instructions executed by the main processor;
detection of a predetermined type of instruction corresponding to an operation which is unsupported by at least one of the checker processors;
detection that the instructions executed in the main stream since a previous checking boundary event correspond to at least a threshold amount of cumulative workload for one of the checker processors.

22. The apparatus according to claim 1, wherein the error detection circuitry is configured to detect said mismatch between the outcome of the given portion of the main stream and the outcome of the corresponding checker stream.

23. The apparatus according to claim 1, wherein the error detection circuitry is configured to trigger one of the checker processors to detect said mismatch between the outcome of the given portion of the main stream and the outcome of the corresponding checker stream.

24. A data processing method comprising:
executing a main stream of program instructions on a main processor;
executing respective checker streams of program instructions in parallel on a plurality of checker processors, the checker streams corresponding to different portions of the main stream executed by the main processor; and
detecting an error when a mismatch is detected between an outcome of a given portion of the main stream executed on the main processor and an outcome of the corresponding checker stream executed on one of the plurality of checker processors.

* * * * *